(12) United States Patent
Greenstein et al.

(10) Patent No.: US 10,785,129 B2
(45) Date of Patent: Sep. 22, 2020

(54) COMPUTERIZED METHODS AND SYSTEMS FOR MAINTAINING AND MODIFYING CLOUD COMPUTER SERVICES

(71) Applicant: ORACLE INTERNATIONAL CORPORATION, Redwood Shores, CA (US)

(72) Inventors: Paul G. Greenstein, Hopkinton, MA (US); Michael J. Carlson, Missoula, MT (US)

(73) Assignee: Oracle International Corporation, Redwood Shores, CA (US)

( * ) Notice: Subject to any disclaimer, the term of this patent is extended or adjusted under 35 U.S.C. 154(b) by 39 days.

(21) Appl. No.: 16/272,100

(22) Filed: Feb. 11, 2019

(65) Prior Publication Data
US 2020/0007418 A1   Jan. 2, 2020

Related U.S. Application Data

(60) Provisional application No. 62/690,535, filed on Jun. 27, 2018.

(51) Int. Cl.
*H04L 12/24* (2006.01)
*G06F 9/50* (2006.01)
*G06F 9/455* (2018.01)

(52) U.S. Cl.
CPC ...... *H04L 41/5054* (2013.01); *G06F 9/45558* (2013.01); *G06F 9/5022* (2013.01);
(Continued)

(58) Field of Classification Search
CPC ............. H04L 41/5054; H04L 41/0806; H04L 41/5051; G06F 9/5022; G06F 9/45558;
(Continued)

(56) References Cited

U.S. PATENT DOCUMENTS 7,383,405 B2   6/2008  Vega et al.
8,046,767 B2  10/2011  Rolia et al.
(Continued)

FOREIGN PATENT DOCUMENTS

CN   102629207 A   8/2012
CN   102655503 B   9/2015

OTHER PUBLICATIONS

Rolia et al., A Capacity Management Service for Resource Pools, ACM Digital Library, pp. 1-2, downloaded on Jan. 25, 2018 from: https://dl.acm.org/citation.cfm?id=1071047.
(Continued)

*Primary Examiner* — Uzma Alam
(74) *Attorney, Agent, or Firm* — Kraguljac Law Group, LLC

(57) ABSTRACT

Systems, methods, and other embodiments associated with modifying a computer-implemented service are described. In one embodiment, a method includes constructing pre-provisioned instances of a service within a first pool and constructing pre-orchestrated instances of the service within a second pool. In response to receiving a request to modify the service, a POM instance of the service is created with a modified version of executable code and assigned to a third pool. The pre-orchestrated instances within the second pool are then replaced using the POM instances from the third pool.

20 Claims, 11 Drawing Sheets

(52) U.S. Cl.
CPC .......... *G06F 9/5072* (2013.01); *G06F 9/5077* (2013.01); *H04L 41/0806* (2013.01); *G06F 2009/45562* (2013.01); *G06F 2209/5011* (2013.01)

(58) Field of Classification Search
CPC ................. G06F 9/5072; G06F 9/5077; G06F 2209/5011; G06F 2009/45562
See application file for complete search history.

(56) References Cited

U.S. PATENT DOCUMENTS

| | | | |
|---|---|---|---|
| 8,316,130 B2 | 11/2012 | Breiter et al. | |
| 8,463,908 B2 | 6/2013 | Murray et al. | |
| 8,595,722 B2 | 11/2013 | Gupta et al. | |
| 8,639,793 B2 | 1/2014 | Kapur et al. | |
| 9,069,590 B2 | 6/2015 | Gupta | |
| 9,141,487 B2 | 9/2015 | Jagtiani et al. | |
| 9,152,405 B2 | 10/2015 | Gupta et al. | |
| 9,189,259 B2* | 11/2015 | Anderson | G06F 9/455 |
| 9,250,944 B2 | 2/2016 | Anderson et al. | |
| 9,251,349 B2 | 2/2016 | Haikney et al. | |
| 9,253,114 B2 | 2/2016 | Anderson et al. | |
| 9,285,196 B2 | 2/2016 | Dettori et al. | |
| 9,361,092 B1 | 6/2016 | Bai et al. | |
| 9,396,220 B2 | 7/2016 | Li et al. | |
| 9,405,530 B2 | 8/2016 | Islam et al. | |
| 9,471,350 B2 | 10/2016 | Pavlas et al. | |
| 9,569,259 B2 | 2/2017 | Fries et al. | |
| 9,582,319 B2 | 2/2017 | Ayala et al. | |
| 9,606,826 B2 | 3/2017 | Ghosh et al. | |
| 9,705,820 B2 | 7/2017 | Madduri et al. | |
| 9,712,503 B1 | 7/2017 | Ahmed et al. | |
| 9,736,252 B2 | 8/2017 | Ferris et al. | |
| 9,755,990 B2* | 9/2017 | Vicaire | G06F 9/5027 |
| 9,779,126 B2 | 10/2017 | Tu et al. | |
| 2008/0022284 A1 | 1/2008 | Cherkasova et al. | |
| 2010/0281285 A1 | 11/2010 | Blanding | |
| 2013/0159453 A1 | 6/2013 | McLean | |
| 2015/0120889 A1* | 4/2015 | Sapaliga | G06F 8/60 709/221 |
| 2015/0286507 A1 | 10/2015 | Elmroth et al. | |
| 2015/0372938 A1 | 12/2015 | Patel et al. | |
| 2015/0372941 A1 | 12/2015 | Patel et al. | |
| 2016/0065417 A1* | 3/2016 | Sapuram | G06F 9/45558 709/223 |
| 2016/0077865 A1* | 3/2016 | Anderson | G06F 9/5077 718/1 |
| 2016/0216986 A1* | 7/2016 | Singh | G06F 9/45558 |
| 2016/0378524 A1* | 12/2016 | Gough | G06F 9/45558 718/1 |
| 2017/0116207 A1 | 4/2017 | Lee et al. | |
| 2017/0116213 A1 | 4/2017 | Jain et al. | |
| 2017/0116249 A1 | 4/2017 | Ravipati et al. | |
| 2017/0116298 A1 | 4/2017 | Ravipati et al. | |
| 2017/0116334 A1 | 4/2017 | Kruglikov et al. | |
| 2017/0187806 A1 | 6/2017 | Wang et al. | |
| 2017/0220389 A1* | 8/2017 | Michael | H04L 67/10 |
| 2018/0075041 A1 | 3/2018 | Susairaj et al. | |
| 2018/0075044 A1 | 3/2018 | Kruglikov et al. | |

OTHER PUBLICATIONS

De et al., Caching Techniques for Rapid Provisioning of Virtual Servers in Cloud Environment, IEEE Conference Publication, pp. 1-3, downloaded Jan. 24, 2018 from: http://ieeexplore.ieee.org/document/6211956/.

De et al., Caching VM Instances for Fast VM Provisioning: A Comparative Evaluation; IBM Research India, pp. 1-11, downloaded on Mar. 9, 2018 from: https://www3.cs.stonybrook.edu/~prade/MyPubs/2012-europar.pdf.

Bankole et al., Predicting Cloud Resource Provisioning Using Machine Learning Techniques; IEEE Xplore Digital Library, pp. 1-2, downloaded on Mar. 9, 2018 from: http://ieeexplore.ieee.org/document/6567848.

Amazon Web Services, Migrating AWS Resources to a New AWS Region, pp. 1-43, downloaded on Mar. 8, 2018 from: https://d0.awsstatic.com/whitepapers/aws-migrate-resources-to-new-region.pdf.

Geier, Moving EC2 Instances Across Availability Zones or AWS Regions, pp. 1-4, downloaded on Jan. 24, 2018 from: https://www.serverwatch.com/server-tutorials/moving-ec2-instances-across-availability-zones-or-aws-regions.html.

Google, Moving an Instance Between Zones, pp. 1-5, downloaded Jan. 19, 2018 from: https://cloud.google.com/compute/docs/instances/moving-instance-across-zones.

Google, Live Migration, pp. 1-4, downloaded Jan. 19, 2018 from: https://cloud.google.com/compute/docs/instances/live-migration.

VMware, Inc., VMware VMotion, Live Migration of Virtual Machines Without Service Interruption, pp. 1-2, downloaded on Jan. 19, 2018 from: https://www.vmware.com/pdf/vmotion_datasheet.pdf.

KVM, Migration, pp. 1-4, downloaded Jan. 19, 2018 from: https://www.linux-kvm.org/page/Migration.

Alibaba Cloud, ApsaraDB for RDS, User Guide, pp. 1-79, downloaded Jan. 19, 2018 from: https://www.alibabacloud.com/help/doc-detail/26181.htm.

Scott Scovell, Migrating Azure Virtual Machines to Another Region / Kloud Blog, pp. 1-3, downloaded Jan. 19, 2018 from: https://blog.kloud.com.au/2014/11/16/migrating-azure-virtual-machines-to-another-region/.

Flanegin, Oracle Access Manager—Upgrade Guide, Oct. 2007, pp. 1-654, downloaded on Mar. 9, 2018 from: https://docs.oracle.com/cd/E12530_01/oam.1014/b32416/zdt_ovr.htm.

* cited by examiner

COMPUTERIZED METHODS AND SYSTEMS FOR MAINTAINING AND MODIFYING CLOUD COMPUTER SERVICES

CROSS REFERENCE TO RELATED APPLICATIONS

This disclosure claims the benefit of U.S. Provisional Patent Application Ser. No. "62/690,535" filed Jun. 27, 2018, titled "Computerized Methods and Systems for Maintaining and Modifying Cloud Computer Services," which is incorporated by reference herein in its entirety.

BACKGROUND

Cloud computing is an information technology (IT) paradigm that enables ubiquitous access to shared pools of configurable system resources and higher-level services that can be rapidly provisioned with minimal management effort, often over the Internet. Third-party clouds enable organizations to focus on their core businesses instead of expending resources on computer infrastructure and maintenance. Cloud providers typically use a "pay-as-you-go" model, a subscription model, or a variety of other models. A cloud computing environment (aka "cloud environment) is a collection of physical and virtual infrastructure hardware and software used to for cloud computing. The cloud computing environment can be used to provide services (known as "cloud services").

The combination of Virtual Machines (VMs), network connectivity among them, their operating systems, and middleware and application software stacks on each VM comprise a service instance. In Oracle cloud services, for example, each service includes a routing tier, a middle tier, and possibly a data tier. Usually, the routing and data tiers are shared among multiple middle tier service instances (hereinafter, instances). Instances are standardized and comprised of a collection (particular to each service) of VM shapes (specifications of CPU, memory, storage).

Cloud services are provisioned on-demand. When a customer orders a service, an order processing system receives the type of service being ordered and submits the request to a service provisioning system, which initiates service provisioning. Service provisioning involves creation, configuration, and startup of the instance. This is a lengthy process that typically takes minutes, but sometimes, under high-demand, can take hours.

The cloud computing environment hosts various services (cloud services) that can be accessed remotely (by remote devices, programs, or people) over a network. As used herein, a remote device accessing the cloud computing environment may correspond to a program executing code, a user, etc. utilizing a remote device (hardware or software) to access the cloud computing environment over a network. Some cloud services are shared—all users access the same instance of a service. Other cloud services require existence of a service instance per user or group of users. The latter, In order to be used by a particular party, need to be provisioned. In prior systems, all cloud services require existence of a service instance per user or group of users. In some cases this group of users includes all users. Regardless of the mapping of instances to users, provisioning is always required. Even if all users share the only existing instance, someone had to provision that instance and, likely, provide user access to it.

A user will subscribe to the cloud computing environment by providing identifying information and an intent to utilize one or more services in the future. Once the subscriber is defined, the subscriber can request access to a service instance. When a request for access to the service is received from a remote device, an instance of the service is created on-demand and executed. On-demand creation and execution of the instance is triggered when the cloud computing environment receives the request for access to the service. A service instance (hereinafter "instance") is a collection of one or more computing resource(s) interrelated in a way defined by the particular service and comprising an orderable and provisionable unit of the service. The instance can be hosted within a virtual machine that executes software of the service using processor, memory, and storage resources of the cloud computing environment. The instance can be comprised of a collection of virtual machines of diverse shapes.

On-demand creation of an instance of a service is time consuming and consumes a large amount of computing resources. The time to create the instance can take minutes or even hours when the cloud computing environment is under high demand. This introduces significant delays in availability of the service to the requestor because the requestor cannot access the service until the instance is fully created and executing. Further, there may not be adequate computing resources available or reserved for the creation of the instance when the request is received, and thus the creation of the instance is further delayed.

When an instance is created, the instance is created within a particular zone of the cloud computing environment. A zone comprises a pool of available resources such as processor, memory, storage, network, and/or other computing resources that can be used by executing instances. The zone can be defined as a logical or physical entity for hosting service instances by utilizing virtual machines and the computing resources of the zone. In this way, the zone is an elastic operational environment that is able to adapt to service workload changes by provisioning and de-provisioning computing resources in an autonomous manner.

When maintenance or upgrades to a cloud service are performed on a large scale, there is typically a multi-hour outage window. This often involves taking components offline, for example, a virtual platform and virtual machines hosting instances of the cloud service, and/or instances themselves offline. Thus, access to the cloud service is suspended during the upgrade or maintenance. Requests to the cloud service will be denied. During upgrade or maintenance, the operation of computers that rely upon computing services and data hosted by the cloud service will be significantly impacted. For example, a remote device executing an application that processes data hosted by the cloud service could timeout, crash, or experience other errors from not being able to access the data. Upgrading and maintaining cloud services can consume a large amount of computing resources and time, which impacts the operation of the cloud computing environment. To perform a zone upgrade or maintenance, instances running in the zone must be brought down, along with their VMs. This process typically takes several hours using prior techniques. Thus, having a cloud service with multi-hour unavailability windows could be disruptive and significantly impact any facilities which are dependent on availability of the cloud service under maintenance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
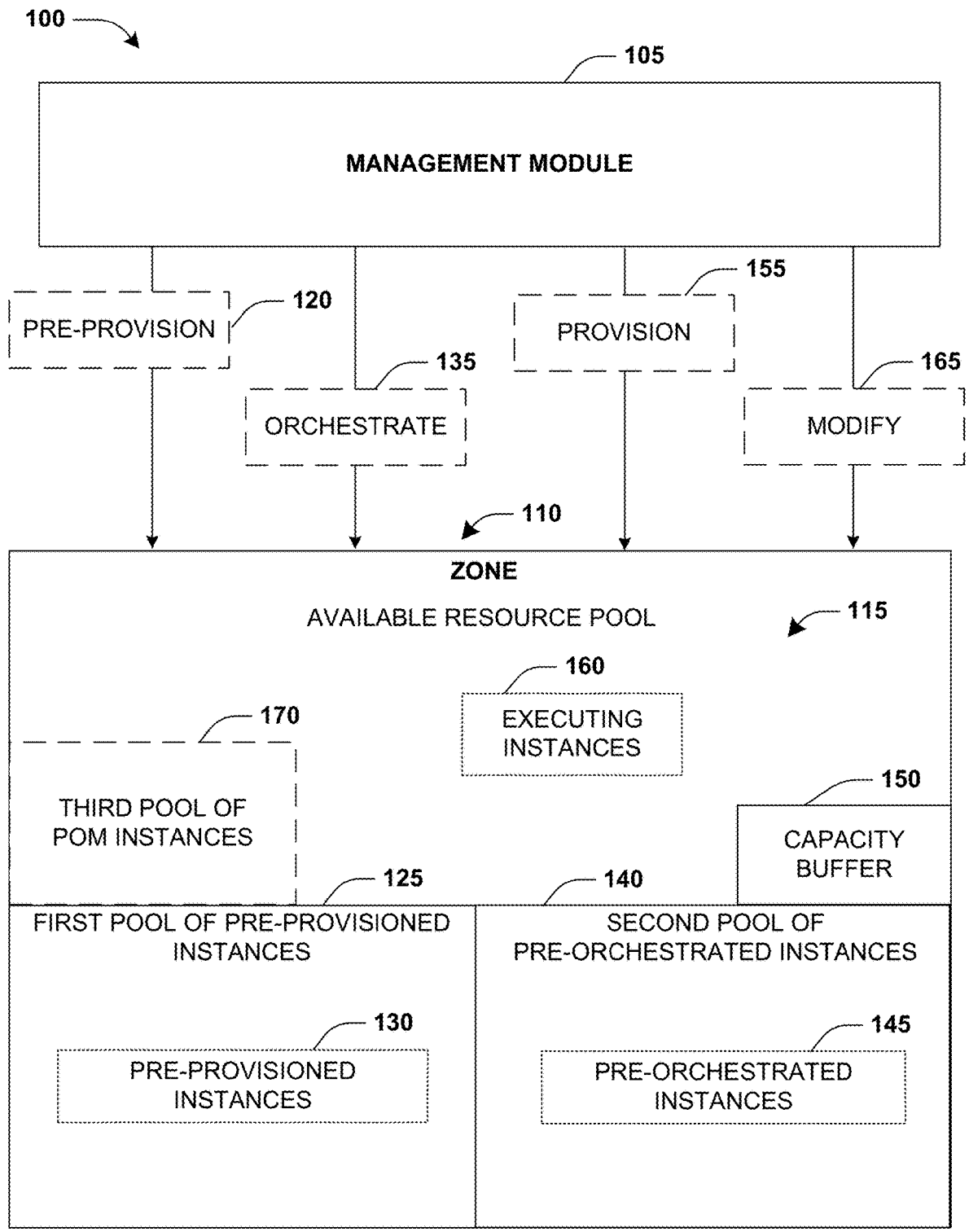
FIG. 1 illustrates an embodiment of a system associated with modifying a service.

Computerized systems and methods are described herein that implement techniques for modifying, such as updating or maintaining, a computer-implemented service. The present systems and methods provide an ability to perform cloud service upgrades or maintenance much faster than prior techniques, thus eliminating or reducing outages with multi-hour unavailability windows. The present systems and method also apply to zone upgrades or maintenance.

As described herein, a cloud computing environment or other computing system is configured to execute instances of services and provide the services upon request to remote computing devices. In one embodiment, a service comprises an application stack. The application stack comprises one or more application programs having executable code that is executed using computing resources of the cloud computing environment. For example, the application stack is a suite or group of application programs that are executed to work together to achieve a common goal. The cloud computing environment may host a variety of services. For example, the service may comprise a calendar service, an email service, a financial analysis service, or any other type of application that can be executed by the cloud computing environment.

As used herein, a "pre-provisioned instance" includes a configured collection of Virtual Machines (VMs) and service-supporting dependencies including computer resources. This is an initial resource configuration but has no specific application software loaded. The pre-provisioned instance is proactively constructed in advance of an anticipated demand for a service so the system can more quickly setup and provide the service when needed. The pre-provisioned instance does not include application software (executable code) of a service and is not yet assigned to a customer in production.

A "provisioned instance" is a pre-provisioned instance that includes the application software for a requested service. The provisioned instance is also uniquely assigned by the system to a customer and is executing in a production setting (referred to as a production instance).

A "pre-orchestrated instance" is a pre-provisioned instance that includes the application software (e.g., initial resource configuration+application software) but is not yet assigned to a customer for execution in production.

An "orchestrated instance" is a pre-orchestrated instance that is uniquely assigned to a customer and is executing in a production setting (i.e., a production instance). Thus, an orchestrated instance and a provisioned instance are the same.

A "Pre-Orchestrated Maintenance (POM) pool" is a collection of pre-orchestrated instances, which are subject to maintenance and/or upgrade.

A "Pre-Orchestrated Maintenance (POM) instance is a pre-orchestrated instance that includes an old version of an application and is now being modified/upgraded with a new version of the application. Also, a POM instance may be a pre-provisioned instance that is selected to have the new version of the application installed into it (thus making it a pre-orchestrated instance with the new version of the application).

A "pointer" as used in one or more embodiments is a means of locating an instance. Pointers and/or tags are used to assign or add (hereinafter referred to as 'assignment') an instance to a selected pool of instances. Pointers are stored and maintained in a data structure stored in a memory. A service instance is typically identified and referred to by a pointer or tag in one of several ways. For example, (1) by an IP address of one of the elements of the instance (such as a front-end load balancer, but possibly one VM of the instance); (2) by a URL or URI of the instance (for example, pointing at the front-end load balancer, but may be directly at VM's Web destination or Web service end point, such as REST or SOAP); (3) by symbolic name translatable via DNS (domain name server) into an IP address (thus reduced to 1); (4) by symbolic name (or tag) translatable by an inventory system into the one of the examples 1-3 above; or (5) by variations of the previous examples. In another embodiment, even though an instance does not have to contain a pointer, the pointer contains the identification of that instance. Thus, if the instance is known, its pointer can be found in one of the pools by searching for the identification within the pointers. If the pointer is not found in a pool, then the instance has not been assigned to that pool.

In another embodiment where instances have multiple virtual machines (multi-VM instances), if it is desired to know all the elements comprising an instance, an inventory system would be consulted, or a self-description method could exist, similar to the above pointers, which would return an enumeration of all entities comprising an instance.

A "pool" of instances, in one embodiment, is defined by a collection of instance pointers that identifies the instances that belong to the pool. For example, a data structure is created to maintain the collection of instance pointers for each pool. When an instance is assigned to a pool, its pointer is added to the corresponding collection of pointers for that pool (e.g., a pool pointer list). When an instance is removed from a pool, its pointer is removed from the corresponding collection of pointers. Moving an instance from pool 1 to pool 2 is a combination of removing the pointer from pool 1 and adding the pointer to the collection of pointers for pool 2.

In one embodiment, a method of pool accounting may be performed by combining a pool affinity status with an inventory system, i.e. one collection of data contains inventory-type information (lists of entities and their relationships to instances) and pool affinity (i.e. list of instances and their relationship to pools). In such context, pool movement would amount to updating fields in inventory records.

An instance of a service is provisioned by configuring one or more VM shapes (e.g., based on specifications of CPU, CPU cycles, a number of processors, memory resources, storage resources, and networking resources) to a computing environment. The computing environment, such as a virtual machine, is configured to execute the executable code of the service through the provisioned instance. That is, a provisioning system determines an appropriate shape and uses resources to create one or more virtual machines to execute a service instance being provisioned. In one embodiment, resources include instances of other services. For example, a service requires a network load balancer and a database. The service will make use of a Load Balancer as a Service (LBaaS) and a DataBase as a Service (DBaaS) as ready, separately provisionable, service instances. The provisioning system may be called (e.g., recursively) to provision lower level services for use by the new service instance being provisioned. In this way, a remote device can access functionality of the service through the executing provisioned instance hosted by the cloud computing environment.

In one embodiment, zones are defined within the cloud computing environment for hosting instances. A zone comprises a pool of available resources such as processor, memory, storage, network, and/or other computing resources that can be used by instances assigned to that zone for execution. The zone is an elastic operational environment that is able to adapt to service workload changes by provisioning and de-provisioning computing resources used by instances in an autonomous manner. The zone can be defined as a logical or physical entity for hosting service instances by utilizing virtual machines and the computing resources of the zone. The cloud computing environment, such as one or more data centers, can comprise a plurality of zones.

As provided herein, operation of the cloud computing environment is improved by performing maintenance and upgrades to services in a quick, efficient, and non-disruptive manner. This technical improvement to existing technical processes is achieved by utilizing pools of pre-provisioned instances and/or pre-orchestrated instances, some of which are Pre-Orchestrated Maintenance (POM) instances. This is further described below.

In one embodiment, instances are assigned to pools and located by pointers and/or tags that identify an assignment relationship between an instance and a pool. A pool of instances is defined by a collection of pointers that belong to that pool. Assigning an instance to a pool involves adding a pointer of the instance to the collection of pointers of the pool. Moving an instance from one pool to another pool involves removing the pointer from a current pool and reassigning (by adding) the pointer of the instance to a different pointer collection associated with the other pool. In one embodiment, a list or collection of pointers is maintained for each pool that identifies the instances that belong to that pool. Performing a physical move of the instance and its resources to a location of the different pool is not needed. However, in another embodiment, a physical move of the instance may be performed.

In one embodiment, pre-provisioned instances are created within a first pool. A pre-provisioned instance is created and configured as a computing environment of computing resources that are made available for subsequent installation and execution of the executable code of a service. The executable code of the service is installed into the pre-provisioned instances to create a pre-orchestrated instances within a second pool. The executable code is installed in a non-executing state, and is not executed until subsequent provisioning.

In one embodiment, a first pre-orchestrated instance is created by retrieving and installing the executable code of a cloud service into a pre-provisioned instance from the first pool. When a request for the service is received, any number of pre-orchestrated instances can be quickly and efficiently provisioned as executing instances of the service and assigned to a requesting customer. This is because the pre-orchestrated instances already comprise the computing environment constructed with computing resources and the pre-installed executable code of the service. Configuring the computing resources and installing the executable code can take minutes to hours under heavy load of the cloud computing environment. In contrast with the present system, initiating execution of the pre-installed executable code using the already established computing environment takes little to no time.

In one embodiment, upgrade and maintenance for the service is performed in a non-disruptive manner by creating a third pool of Pre-Orchestrated Maintenance (POM) instances. In particular, a modified version of the executable code of the service is installed into pre-provisioned instances from the first pool to create the POM instances. In one embodiment, the modified version of the executable code may correspond to an upgraded/updated version of an application of the service. In this way, POM instances contain an up-to-date version of the application.

The corresponding pre-orchestrated instances, having the previous version (out-of-date version) of the application, are destroyed from the second pool to release computing resources back into an available resource pool of the zone. The POM instances are then moved from the third pool to the second pool. The move includes a combination of removing the instance pointer and/or tag (that identifies the POM instance) from the collection of pointers of the third pool, and adding the instance pointer and/or tag to the collection of instance pointers of the second pool. As a result, the POM instance is now assigned to the second pool of pre-orchestrated instances and is available for provisioning to a customer.

After the pointer(s) is added to the collection of pointers of the second pool, the POM instances are assigned to the second pool so that the second pool comprises the POM instances that have the updated version of the application. In this way, executing instances of the service can be provisioned using the POM instances that are now available from the second pool to become production instances. This computer implemented technique provides for non-disruptive upgrade and maintenance of a service. This is because the POM instances can be quickly and efficiently provisioned as up-to-date executing instances of the service when they are assigned to a customer in a production setting.

With reference to FIG. 1, one embodiment of a system 100 associated with modifying a service is illustrated and summarized. A more detailed description is provided with reference to FIG. 2. The system 100 is implemented as a management module 105 hosted on a computing device. In one embodiment, the management module 105 is associated with a cloud computing environment that hosts services made accessible to remote devices. Such services can correspond to application hosting services, Software as a Service (SaaS), network storage, Platform as a Service (PaaS), Infrastructure as a Service (IaaS), and a wide variety of other software applications and computer implemented services. Such instances of services are executed using computing resources of the cloud computing environment.

Zones of computing resources of the cloud computing environment can be defined as a logical or physical entity for hosting instances of services utilizing virtual machines and computing resources of each zone. A zone is an elastic operational environment that is able to adapt to service workload changes by provisioning and de-provisioning computing resources in an autonomous manner. In one embodiment as used herein, elastic computing is a concept in cloud computing in which computing resources can be scaled up and down easily by the cloud service provider. Elastic computing is the ability of a cloud service provider to provision flexible computing power when and wherever required. The elasticity of these resources can be in terms of processing power, storage, bandwidth, etc.

A zone 110 is defined to comprise an available resource pool 115 of processor, memory, storage, network, and/or other computing resources. In this way, executing instances 160 of services can be executed within the zone 110 using computing resources of the available resource pool 115.

The management module 105 maintains a first pool 125 of pre-provisioned instances within the zone 110. For example, the management module 105 constructs pre-provisioned instances 130 of a service within the first pool 125 (e.g., represented by pre-provision function block 120 in FIG. 1). A pre-provisioned instance is a proactively constructed configuration of computing resources of the zone 110 as a computing environment that can be subsequently used to execute executable code of the service. The computing environment may comprise processor, memory, storage, and network resources, a virtual machine, and/or other computing resources used to execute the executable code.

The management module 105 maintains a second pool 140 of pre-orchestrated instances 145 of the service. A pre-orchestrated instance is constructed 135 by installing executable code (application software of a service), such as an application stack, into a pre-provisioned instance. In this way, the pre-orchestrated instance comprises the computing environment and executable code of the service in a non-executing state. Thus, the pre-orchestrated instance is ready for quick provisioning 155 as an executing instance of the service by assigning the pre-orchestrated instance to a customer and by executing the executable code in a production setting using the computing environment.

The management module 105 maintains a capacity buffer 150 for the zone 110. The capacity buffer 150 is assigned available resources that are used as reserved computing resources. The reserved computing resources are not available for general execution of executing instances. Instead, the reserved computing resources are exclusively used by the management module 105, such as in the event additional computing resources are needed. The reserved computing resources can be used to expand the available resource pool 115, the first pool 1425 of pre-provisioned instances, and/or the second pool 140 of orchestrated instances.

The management module 105 is configured to non-disruptively modify a service, such as to upgrade or maintain the service. In one embodiment, the management module 105 determines that there is a modified version of the executable code available. In one example, this determination can be made based upon a provider of the service transmitting a notification of availability of the modified version to the management module 105. The modified version of the executable code may correspond to an updated/upgraded version of an application of the service. In this way, the management module 105 receives a request to modify the service, such as from the provider of the service.

In response to receiving the request to modify the service, the management module 105 retrieves a modified version of the executable code of the service, such as from the provider. For example, the management module 105 retrieves an installation package that can be executed to install the updated/upgraded version of the application into a computing environment. The management module 105 utilizes the modified version of the executable code to modify 165 the service hosted by the zone 110.

In particular, the management module 105 creates a third pool 170 of Pre-Orchestrated Maintenance (POM) instances of the service. This pool is a collection of pre-orchestrated instances that have been upgraded. In one embodiment, the third pool 170 is called a Pre-Orchestrated Maintenance (POM) pool. Zones are enhanced with a Pre-Orchestrated (PO) pool segment intended for maintenance or upgrades (called herein Pre-Orchestrated Maintenance, POM). Like pre-provisioned pools and pre-orchestrated pools, a POM pool is created for a service. Unlike pre-provisioned and pre-orchestrated pools, the POM pool does not exist permanently. Instead, POM pool segments are created in preparation for an upgrade or maintenance operation and is consumed through upgrade or maintenance.

A maintenance/modify function is represented by block 165 in FIG. 1. In one embodiment, a POM pool contains at least an amount of pre-orchestrated instances that need to be upgraded or maintained concurrently. The POM pool may be created at the expense of a pre-provisioned pool, i.e. pre-provisioned instances may be pre-orchestrated to comprise a POM pool.

The management module 105 constructs and groups one or more pre-orchestrated instances, which are subject to maintenance and/or modification, within the third pool 170 (a POM pool). Pre-orchestrated maintenance instances (hereinafter "POM instance") are created using a level of software (e.g., a new/modified version) that is different from the version used by production instances. Each instance in the POM pool, once pre-orchestrated, would be at a target level of maintenance (i.e. the level desired for transition of production instances). Upgrade or maintenance of a production instance can be accomplished by replacing the production instance using a POM instance, i.e. an instance already upgraded or maintained. Performing the modification, in one embodiment, is further explained with reference to FIG. 2.

The POM instance is constructed by applying/installing the modified version of the executable code into a selected pre-provisioned instance from the first pool 125. For example, the installation package is executed to install the updated/upgraded version of the application into the pre-provisioned instance to create a POM instance and reassign the pre-provisioned instance (which becomes the POM instance) to the third pool 170. As previously stated, the reassignment involves removing the instance pointer from the first pool of pointers, and adding the instance pointer and/or tag to the collection of instance pointers of the third pool 170. In this way, the pre-provisioned instance is logically removed from the first pool 125 and moved to the third pool to become the POM instance in the POM pool 170 (third pool).

After the upgrade that creates the one or more POM instances is completed, the management module 105 replaces the corresponding pre-orchestrated instances 145 within the second pool 140 with the POM instances from the third pool 170. This includes removing the instance pointers of the pre-orchestrated instances 145 from the second pool and decommissioning their resources. In particular, the pre-orchestrated instances 145 are decommissioned/destroyed to release computing resources assigned to the pre-orchestrated instances 145 back to the available resource pool 115. Thus, the computing resources can be utilized for other purposes, such as for executing instances of services or replenishing/expanding other pools.

The management module 105 reassigns the POM instances from the third pool 170 to the second pool 140 by removing the respective pointers of the POM instances from the third pool and adding the pointers to the second pool 140. In effect, this replaces the decommissioned/destroyed pre-orchestrated instances with the upgraded versions of the POM instances. Thereafter, the POM instances can be quickly provisioned 155 from the second pool 140 as executing instances of the service (a production instance) having the modified version of the executable code. The third pool 170 can be removed after all the POM instances are moved/reassigned to the second pool 140.

Proactively constructing the POM instances within the third pool 170 allows for non-disruptive upgrade and maintenance for the service. This is accomplished because remote computers can still access existing executing instances of the service (the orchestrated/production instances). Also, new requests for execution of the service can still be processed by the pre-orchestrated instances within the second pool 140 while the POM instances are being constructed as part of the third pool 170.

There is little to no disruption from reassigning the POM instances from the third pool 170 to the second pool 140. This is because the POM instances are already constructed with the computing environment of assigned computing resources and installed with the modified executable code of the service. The actual reassigning involves simple pointer operations. The construction of the POM instances is time consuming, and thus is proactively performed while the pre-orchestrated instances 145 within the second pool 140 are still available to be provisioned to satisfy requests for the service. The decommissioning of the pre-orchestrated instances 145 and the reassignment of the POM instances to the second pool 140 is very quick since it is performed by removing and adding the instance pointers. Thus, new requests for the service from remote computers experience little latency or disruption.

Figure 2:
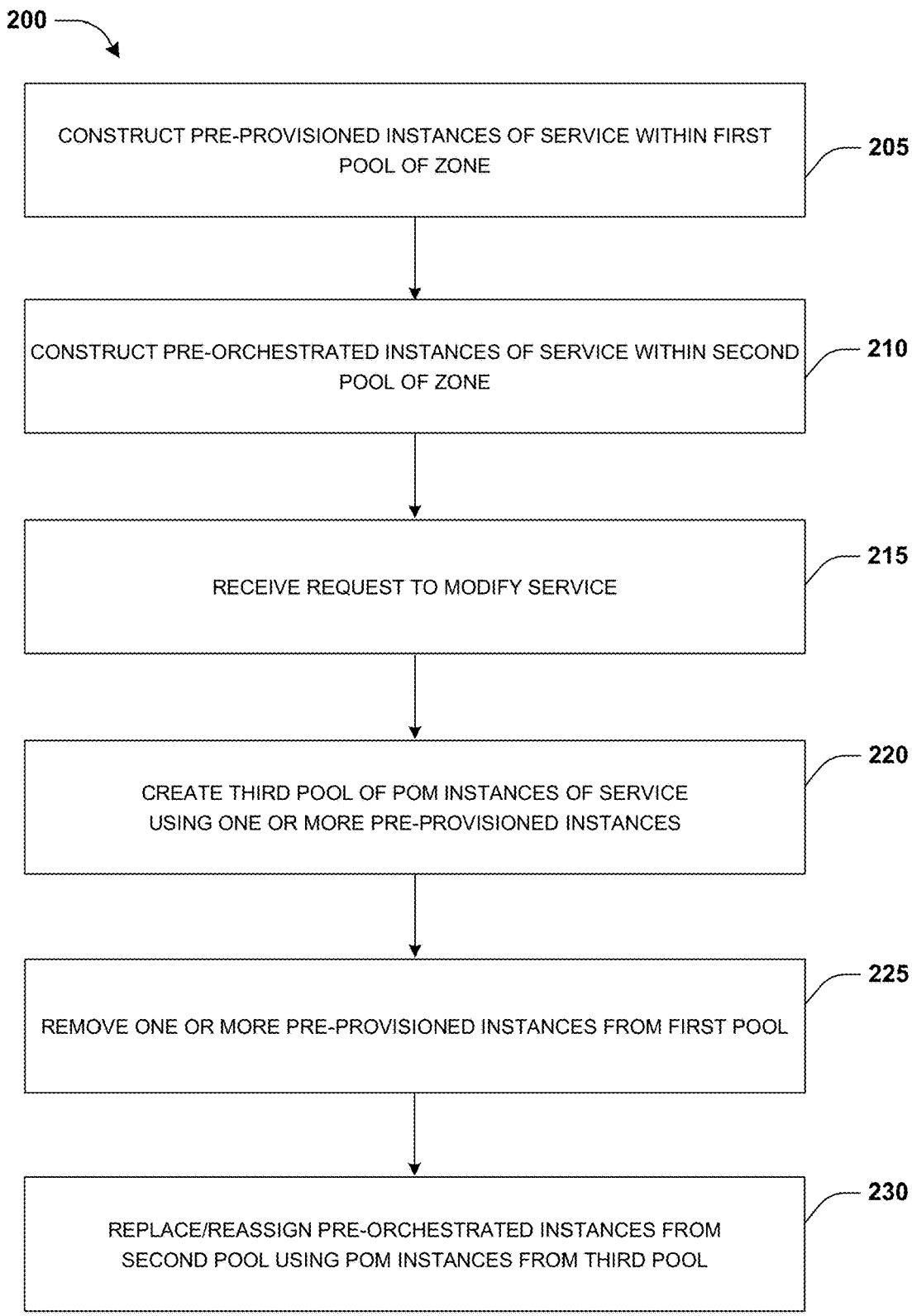
FIG. 2 illustrates an embodiment of a method associated with modifying a service.

With reference to FIG. 2, one embodiment of a computer implemented method 200 is illustrated that is associated with modifying a computer-implemented service by, for example, upgrading and/or maintaining the service. In one embodiment, the method 200 is performed by the management module 105 and system 300 of FIGS. 3A-3E utilizing various computing resources of a computer system (e.g., computer 515 of FIG. 5) that is configured as a special purpose machine to implement the disclosed features in one or more combinations, and/or other computers similarly configured. The computing resources, such as the processor 520, are used for executing instructions associated with constructing pre-provisioned instances, pre-orchestrated instances, and POM instances of a service. Memory 535 and/or storage devices (e.g., disks 555) are used for storing the pre-provisioned instances, the pre-orchestrated instances, and the POM instances and/or other data. Network hardware is used for providing remote devices with access to executing instances of the services over a network. The method 200 is triggered upon a command to modify a service, in one embodiment.

The cloud computing environment comprises computing resources, such as servers, networking equipment, and storage used to host services. The services are made accessible by the cloud computing environment to remote devices over a network. Such services can correspond to a wide variety of services, such as storage services, application hosting services, network analysis, etc. For each remote device requesting access to the service, an instance of the service is provisioned and executed, such as executing instances 315 shown in FIG. 3A. An instance is executed using computing resources of the cloud computing environment provisioned for the instance. In one embodiment, an instance is hosted within a virtual machine that has access to the provisioned computing resources, such as processor, memory, storage, and networking resources.

Figure 3A:
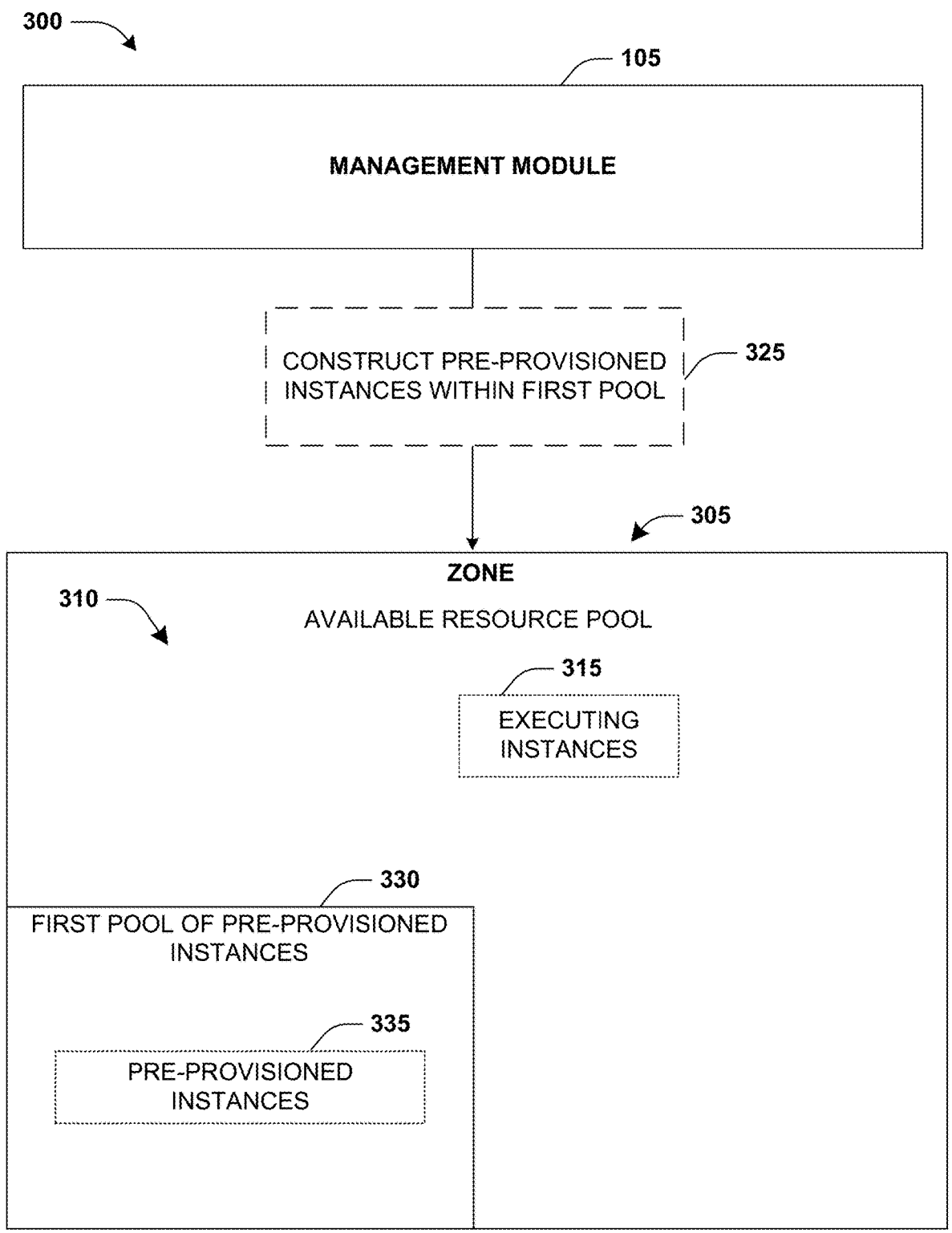
FIG. 3A illustrates an embodiment of a system associated with modifying a service, where pre-provisioned instances are constructed and assigned to a first pool.

Zones may be defined within the cloud computing environment such as a zone 305, as illustrated by FIG. 3A. The zone 305 is an operational environment of computing resources that can be used to host instances of services. The zone 305 may be defined as a logical or physical entity for hosting instances of services utilizing virtual machines and the computing resources of the zone 305. In this way, services are assigned to particular zones so that instances of those services can be executed using computing resources of those zones.

Available resource pools are assigned to each zone of the cloud computing environment, such as an available resource pool 310 for the zone 305. An available resource pool of a zone comprises processor, memory, storage, and network resources (e.g., IP addresses) that can be used by executing instances of services. For example, a virtual machine, executing an instance of an analytics application, can utilize the available resources for executing the analytics application. In this way, provisioned instances of services can be executed through virtual machines utilizing available resources from an available resource pool of a zone. In one embodiment, the executing instances 315 of a service may be executed within the zone 305 using available resources from the available resource pool 310 of the zone 305.

The cloud computing environment comprises a routing tier. The routing tier comprises network routing hardware and functionality. The routing tier is configured to direct requests from remote devices for a service to appropriate instances of the service. Similarly, the routing tier transmits information and data from an executing instance to a remote device. In this way, data is transferred by the routing tier between remote devices and instances hosted by the cloud computing environment. The routing tier can be used to transmit data between instances, such as where an instance of one service processes data from an instance of another service.

In one embodiment, routing tier migration is performed where the routing tier is not running in a same zone as a middle tier hosting a service instance being migrated. In another embodiment, the routing tier may be running in the same zone (infrastructure) as the middle tier. For example, there could be a combined routing tier/middle tier integrated instance, and thus the routing tier would be moved as part of moving the integrated instance. That is, the migration of either the routing tier integrated instance or the middle tier integrated instance would (eventually) precipitate the move of the other integrated instance, such as for the purpose of efficiency.

In one embodiment, a service instance includes other service instances. For example, an instance (S) of service (X) includes a routing tier instance (R) and a logging service instance (L). A migration (move) may be initiated. The migration can be initiated by a move of routing tier instance (R), which would require a move of instance (S), which would also entail moving logging service instance (L). The migration can be initiated by a move of logging service instance (L), which would require a move of instance (S), which would also entail moving routing tier instance (R). The migration can be initiated by a move of instance (A), which would require the move of the routing tier instance (R) and the logging service instance (L).

In one embodiment, one or more remote customer computers accessing the service are routed by the routing tier to the executing instances 315 and/or other executing instances of the service. The executing instances 315 of the service are executed within the zone 305 for remote customer computers. Thus, access requests from the remote customer computers are routed to corresponding executing instances 315 within the zone 305.

The cloud computing environment comprises a data tier. The data tier comprises a plurality of storage devices, databases, and data access functionality. Customer data of customers that utilize the services of the cloud computing environment is stored within the data tier. In this way, when a remote customer computer invokes an instance of a service to execute, the instance will process customer data that is stored within the data tier for that remote customer computer. For example, a user of the remote customer computer may log into the cloud computing environment through a user account. The user account may have access rights to certain storage within the data tier. Thus, customer data of the user is stored within such storage.

With further reference to FIG. 3A, the cloud computing environment comprises the management module 105 (from FIG. 1). The management module 105 is configured to maintain, update, and/or modify service instances hosted by the cloud computing environment. This is accomplished through the use of pools of pre-provisioned instances, pre-orchestrated instances, and POM instances as previously described.

In particular, the management module 105 constructs pre-provisioned instances 335 of a service, such as an email service, within a first pool 330, see block 205 in FIG. 2. This is also represented by function block 325 in FIG. 3A. A pre-provisioned instance is constructed by proactively configuring and setting up computing resources from the available resource pool 310 to the pre-provisioned instance before there is a demand for the service. The computing resources are provisioned to create a computing environment configured for subsequent installation and execution of executable code of the email service.

Such computing resources may comprise processor, memory, storage, and networking resources that will be needed to execute an instance of the email service. Provisioning the computing resources can be time consuming and resource intensive, and can take minutes to hours depending on load of the cloud computing environment. Thus, the pre-provisioned instances 335 of the email service are proactively constructed ahead of time in anticipation of demand for the email service. In this way, when there is demand for the email service, the pre-provisioned instances can be used to satisfy such demand.

Figure 3B:
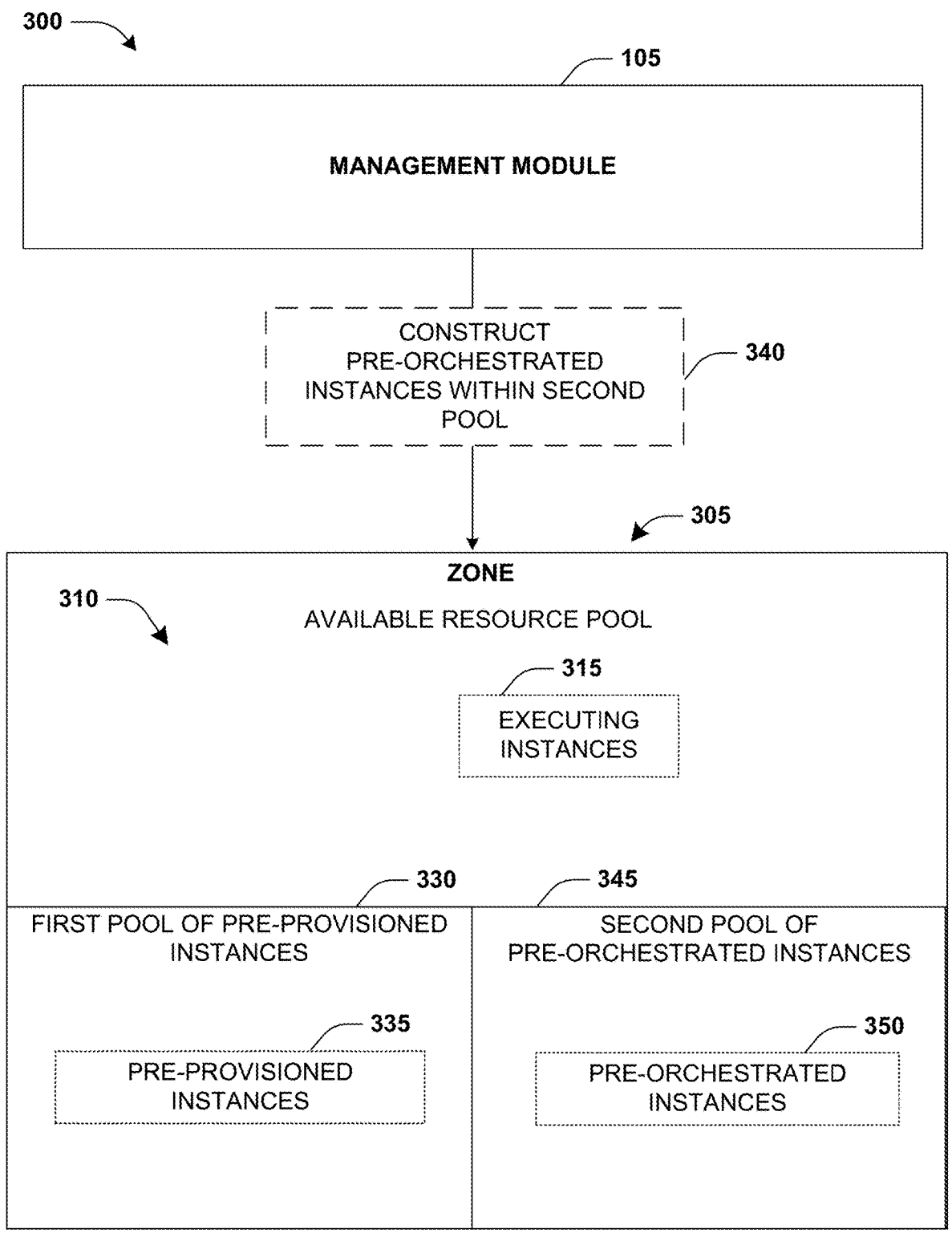
FIG. 3B illustrates an embodiment of a system associated with modifying a service, where pre-orchestrated instances are constructed and assigned to a second pool.

With reference to FIG. 2, at 210, the management module 105 constructs pre-orchestrated instances 350 of the service, such as the email service, within a second pool 345, as illustrated by block 340 in FIG. 3B. A pre-orchestrated instance comprises the executable code of the email service installed in a non-executing state into one of the pre-provisioned instances. In one embodiment, the pre-orchestrated instance is created by installing the executable code of the email service (service software) into the computing environment of a pre-provisioned instance from the first pool 330. The pre-provisioned instance is removed from the first pool 330 by removing its instance pointer from the pointer list of the first pool. The instance pointer is then added to the pointer list of the second pool and the pre-orchestrated instance (with installed service software) is created within the second pool 345.

The first pool 330 may be replenished with more pre-provisioned instances to replace those used to construct the pre-orchestrated instances 350. The pre-orchestrated instances 350 are proactively constructed ahead of time for the email service. This is because the allocating of computing resources and the installation of the executable code can be time consuming and resource intensive. Thus, any number of executing instances of the email service can be quickly and efficiently provisioned by assigning a pre-orchestrated instance 350 to a requesting customer (thus becoming an orchestrated instance) and merely executing the executable code within the pre-orchestrated instances 350 thereby making the service available.

Figure 3C:
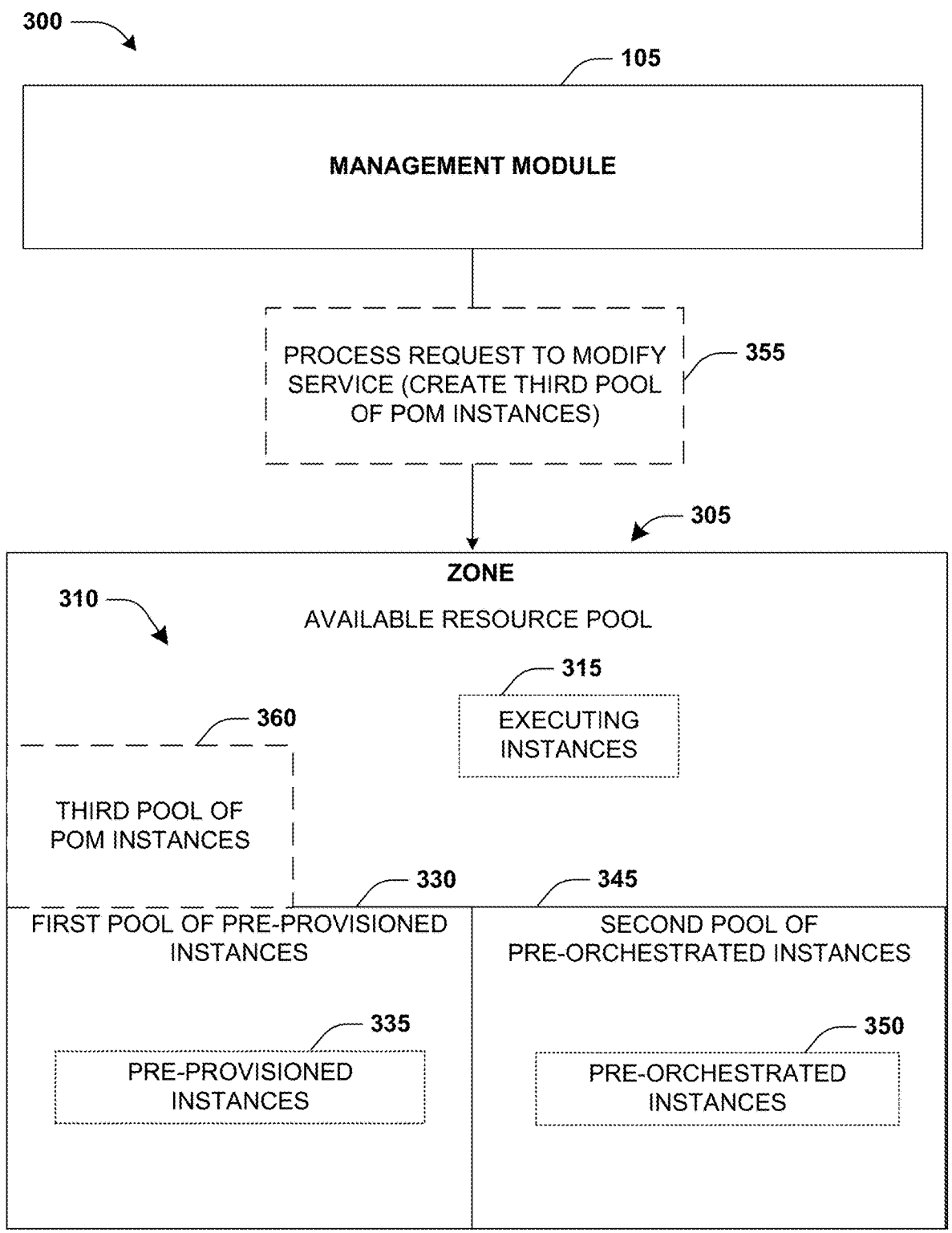
FIG. 3C illustrates an embodiment of a system associated with modifying a service, where POM instances are created and assigned to a third pool.

At block 215 of FIG. 2, the process continues where a request is received to modify the service, such as the email service, see also FIG. 3C. In one embodiment, the modification corresponds to maintenance or an upgrade that is to be performed for the email service. The upgrade could correspond to an update to the executable code of the email service, such as to add new functionality provided by the email service. The maintenance could correspond to a modification to the executable code to address a bug or other issue of the email service.

In one example, the request could be received by the management module 105 from a provider of the email service. In another example, the request could correspond to a notification that the update is available. In response to receiving the request, any new provisioning of executing instances of the email service is suspended. The provisioning is suspended so that new executing instances are not created and executed using the older version of the executable code of the email service. The provisioning may be suspended until the maintenance or upgrade is performed by an upgrade process.

At 220, management module 105 processes the request to modify the service by creating a third pool 360 (the POM pool) within the zone 305 (also represented by block 355 in FIG. 3C). The third pool 360 is created as a temporary repository for constructing and storing POM instances of the email service for the upgrade process. A data structure is created to maintain a collection of instance pointers that identify the instances belonging to the third pool. The POM instances are created within the third pool 360 by applying a modified version of the executable code for the email service. The modified version of the executable code is applied to (installed into) one or more pre-provisioned instances from the first pool 330 to create the POM instances that will be part of the third pool 360. In one example, the modified version of the executable code may correspond to the executable code of the email service as upgraded using the update of the email service. In another example, an installation package of the service is executed to install the modified version of the executable code into computing environments of pre-provisioned instances.

At 225, once the modified version of the executable code is applied to the pre-provisioned instances to create the POM instances, those pre-provisioned instances are removed from the first pool 330 (or vice versa). In one embodiment, the pre-provisioned instance is removed by moving its pointer from the collection of instance pointers of the first pool 330 to the collection of instance pointers of the third pool 360. This may include removing the instance pointer from the pointer list maintained for the first pool and adding the instance pointer to the pointer list of the third pool, where the pointer list of each pool identifies all the instances that belong to each respective pool. The first pool 330 can be replenished with new pre-provisioned instances to replace those pre-provisioned instances that were used to create the POM instances.

Figure 3D:
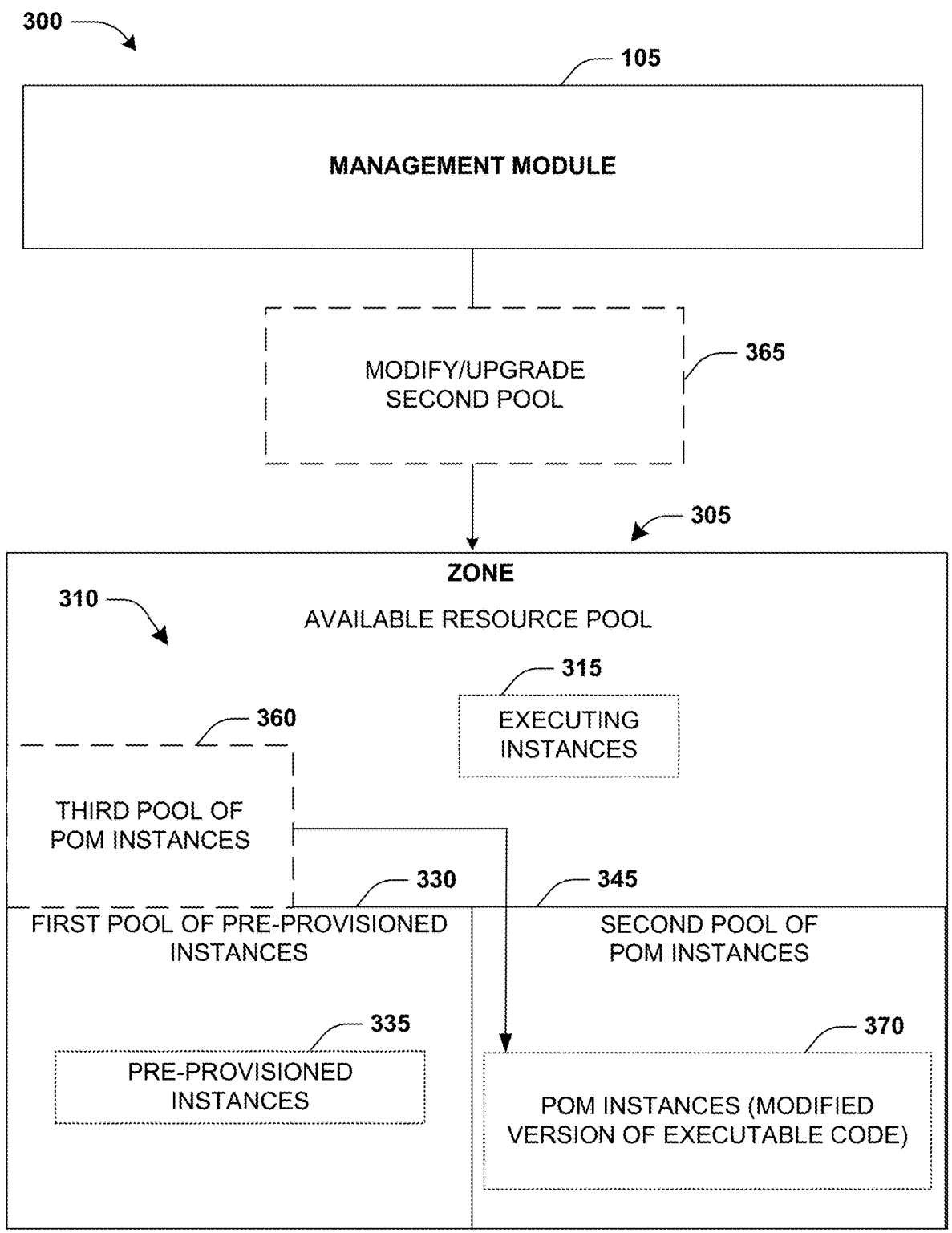
FIG. 3D illustrates an embodiment of a system associated with modifying a service, where the second pool is updated with POM instances.

At 230, after the POM instance(s) is created, the corresponding old version of the pre-orchestrated instances 350 within the second pool 345 are replaced. The pre-orchestrated instances 350 are replaced by using the POM instances from the third pool 360 (see block 365 in FIG. 3D representing the upgrade process to modify the second pool). In particular, the pre-orchestrated instances 350 having the out-of-date executable code are decommissioned to release the allocated computing resources back to the available resource pool 310 and their pointers are removed from the pointer list of the second pool.

The POM instances are reassigned from the third pool 360 to the second pool 345 by removing the corresponding pointers from the pointer list of the third pool and adding the corresponding pointers and/or tags to the pointer list of the second pool 360. The reassigned instances are shown as POM instances 370 in the second pool 345 in FIG. 3D. The POM instances 370 have the modified version (e.g., an up-to-date version) of the executable code for the service. In this way, the POM instances 370 replace the decommissioned pre-orchestrated instances in the second pool 345 and are now available for provisioning to a customer as upgraded pre-orchestrated instances. After all of the POM instances are removed/reassigned from the third pool 360, the third pool 360 is decommissioned/destroyed.

In one embodiment of the upgrade process, multiple pre-orchestrated instances may be replaced in parallel. In particular, resource availability of a data center hosting the zone 305 is evaluated to determine what resources are available for performing the upgrade 365. If the resource availability is sufficient to upgrade and replace all of the pre-orchestrated instances in parallel, then all of the pre-orchestrated instances will be replaced in parallel with corresponding POM instances from the third pool. However, the resource availability may indicate that less than all of the pre-orchestrated instances can be replaced in parallel.

Accordingly, a number of pre-orchestrated instances that can be replaced in parallel are determined based upon resource availability. The pre-orchestrated instances may be grouped into sets of pre-orchestrated instances that comprise no more than the number of pre-orchestrated instances that can be replaced in parallel. For each set of pre-orchestrated instances, the pre-orchestrated instances within a set of pre-orchestrated instances are replaced in parallel using POM instances within the third pool 360. In one embodiment, the replacing is performed by removing/deleting the pointers of the pre-orchestrated instances being replaced from the collection of instance pointers of the second pool. The pointers of the POM instances are added to the collection of pointers of the second pool thereby making the POM instances the upgraded pre-orchestrated instances that are now available for assignment to customers. The pointers of the POM instances are also removed from the third pool. Parallel replacement efficiently utilizes available resources in a manner that improves the speed of the upgrade process 365.

In one embodiment, the upgrade process 365 is monitored to detect any errors. In one example, an error may occur with respect to creating the POM instances. The error may correspond to an inadequate amount of computing resources within the computing environments of the pre-provisioned instances 335 for storing or executing the modified version of the executable code. Thus, new pre-provisioned instances having an adequate amount of computing resources may be created and used for constructing the POM instances. Other errors may occur with respect to modifying the second pool 345 to comprise the POM instances 370. Accordingly, an alert of the error is generated and transmitted over a network to a remote device, such as to alert an administrator or a provider of the service of the error.

Figure 3E:
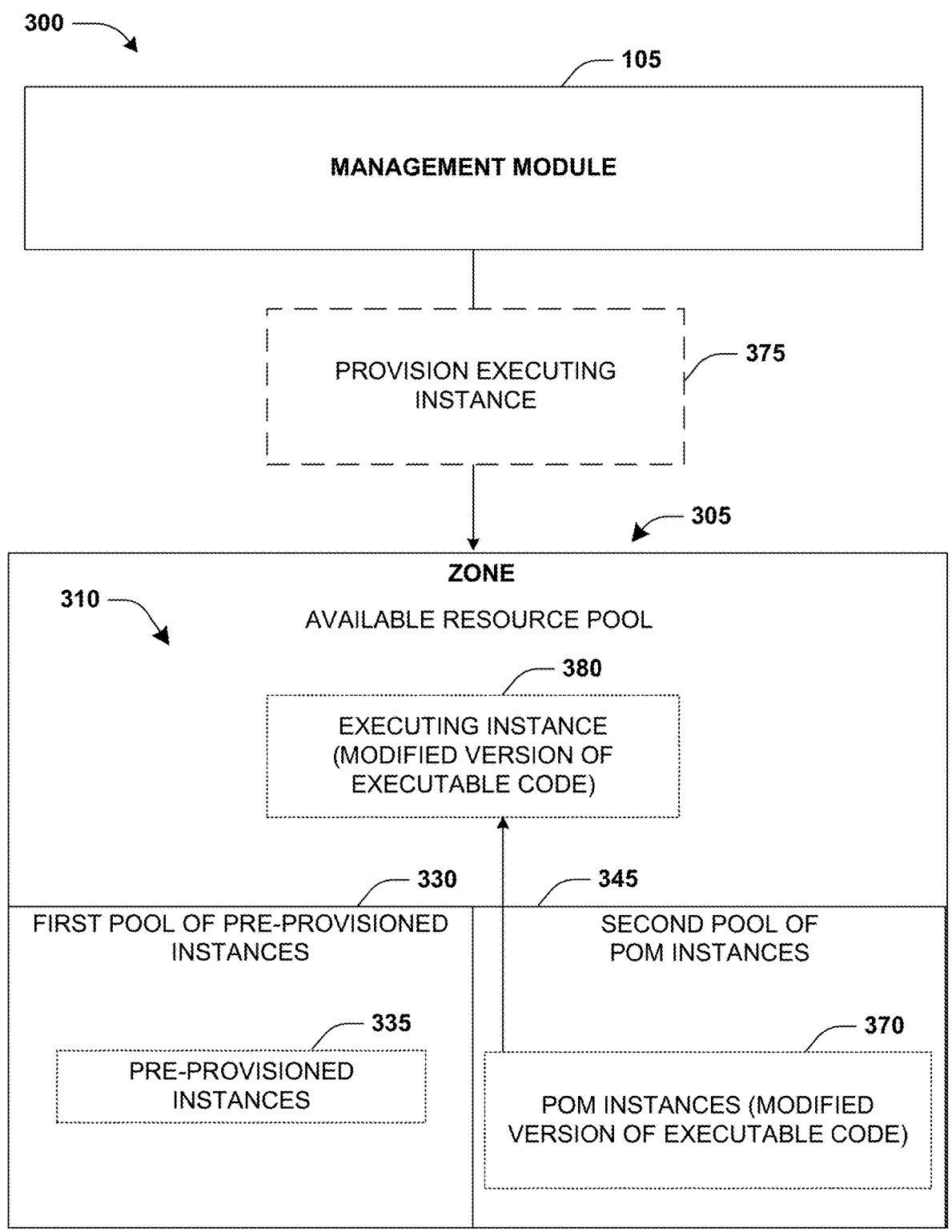
FIG. 3E illustrates an embodiment of a system associated with modifying a service, where a POM instance of a service is provisioned as an executing instance.

After the second pool 345 includes the POM instances 370, new executing instances of the email service can be provisioned using the POM instances 370, as illustrated by provisioning block 375 in FIG. 3E. For example, a request for execution of the email service is received from a remote device. For example, a user of the remote device may be attempting to access an email account hosted by the email service. Accordingly, the management module 105 provisions a POM instance from the second pool 345 as an executing instance 380 of the email service. The POM instance is provisioned by assigning the instance to a customer and executing the modified version of the executable code using the computing environment of the POM instance.

In this way, the remote device is provided with access to the executing instance 380 that is executing the modified version of the executable code. Once the POM instance is provisioned and assigned to a customer, the POM instance is automatically removed from the second pool 345 by removing/deleting its pointer from the collection of instance pointers that belong to the second pool.

In one embodiment, pre-existing executing instances (old version) of the email service can also be replaced with upgraded instances. In particular, the executing instances of the email service are replaced using the POM instances 370 (new version) from the second pool 345. The POM instances 370 are provisioned as new executing instances that are executing the modified version of the executable code. Remote devices currently accessing and interacting with the pre-existing executing instances are redirected to the new executing instances so that the remote devices can access the modified version of the executable code.

The executing instances with the old version of the executable code are decommissioned. These executing instances are decommissioned to release their allocated computing resources back into the available resource pool 310 of the zone 305. For example, virtual machines hosting the existing executing instances are decommissioned to release processor, storage, memory, and network resources utilized by the virtual machines.

In another embodiment, zone maintenance and/or upgrade may be performed for the zone 305. For example, a request to modify the zone 305 is received by the management module 105. Accordingly, executing instances of the email service and/or other services hosted by the zone 305 are removed/migrated from the zone 305 to a second zone. Thus, remote devices accessing the executing instances will be routed to the second zone while the zone 305 is being modified. Once migrated, the zone 305 is modified and a pool of POM instances, such as the third pool 360, is created based upon modifications made to the zone 305. Pre-Orchestrated instances of each service of the zone 305 are replaced using the POM instances from the pool of POM instances. Thereafter, the POM instances can be provisioned as executing instances of the services. The remote devices may be redirected from the second zone to the new executing instances of the services within the zone 305.

Proactively constructing the POM instances within the third pool 360 allows for non-disruptive upgrade and maintenance for the email service, which is in the second pool. This is enabled because remote customer computers can still access the pre-existing executing instances of the email service while the upgrade is being performed in a different pool. Also, new requests for execution of the service can still be processed using the pre-orchestrated instances within the second pool 345 while the POM instances are being constructed and upgraded within the third pool 360. There is little to no disruption from reassigning the POM instances from the third pool 360 to the second pool 345. This is because the POM instances are already constructed with the computing environment of assigned computing resources and installed with the modified executable code of the email service.

Thereafter, pointers for the POM instances are simply moved from the pointer list of the third pool to the pointer list of the second pool to make the POM instances available for provisioning as upgraded pre-orchestrated instances. As stated previously, the moving includes removing/deleting the instance pointer from the pointer list of the third pool and adding the instance pointer to the pointer list of the second pool. The construction of the POM instances is the time consuming part of the upgrade process, and thus is performed while the pre-orchestrated instances 350 within the second pool 345 are still available to be provisioned to satisfy requests for the email service. The decommissioning of the pre-orchestrated instances 350 and the reassignment of the POM instances take much less time than the construction and modification process. Thus, new requests for the email service from remote customer computers experience little delay or disruption.

Figure 4:
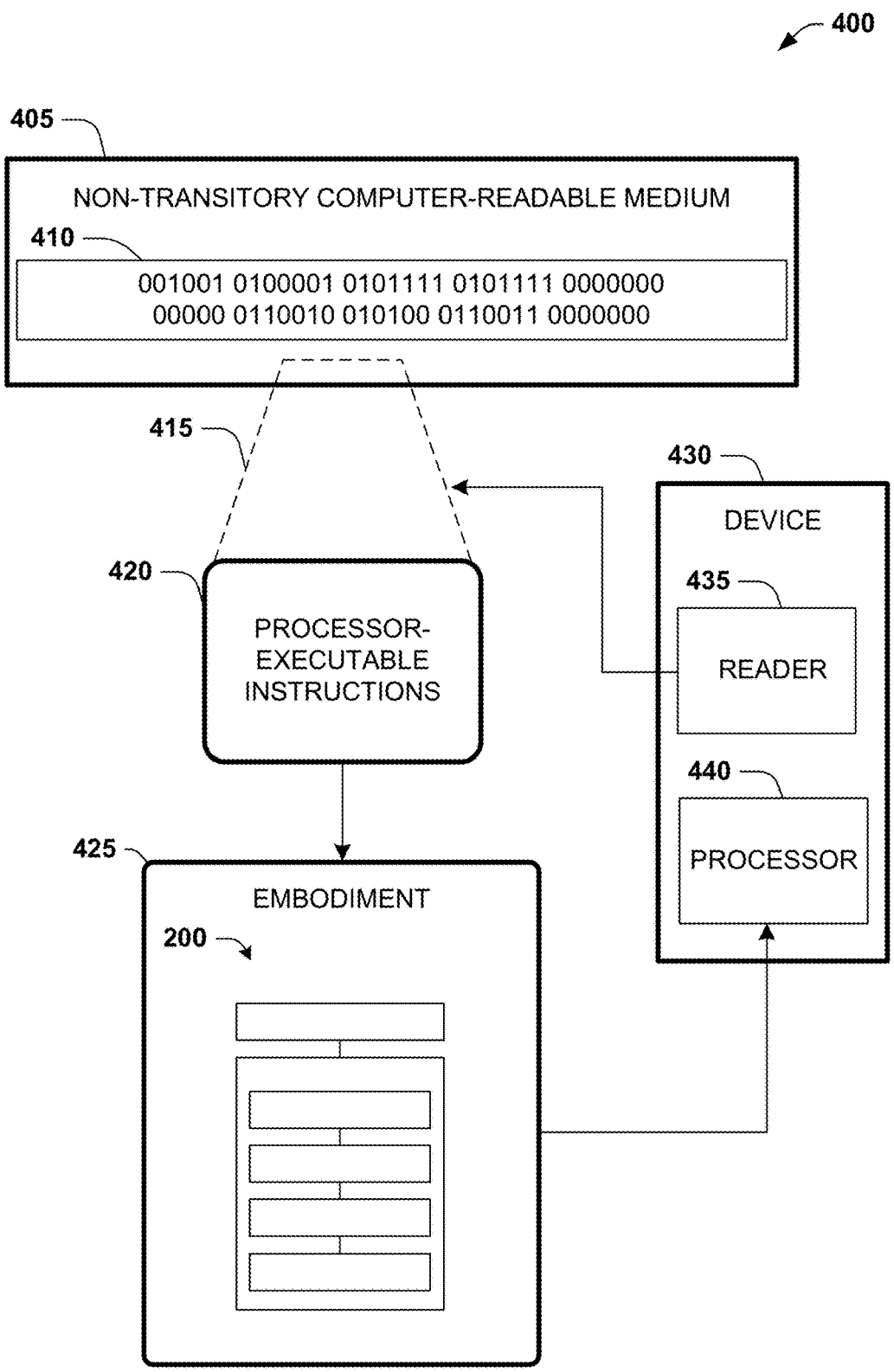
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the management module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the management module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, a solid-state drive, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
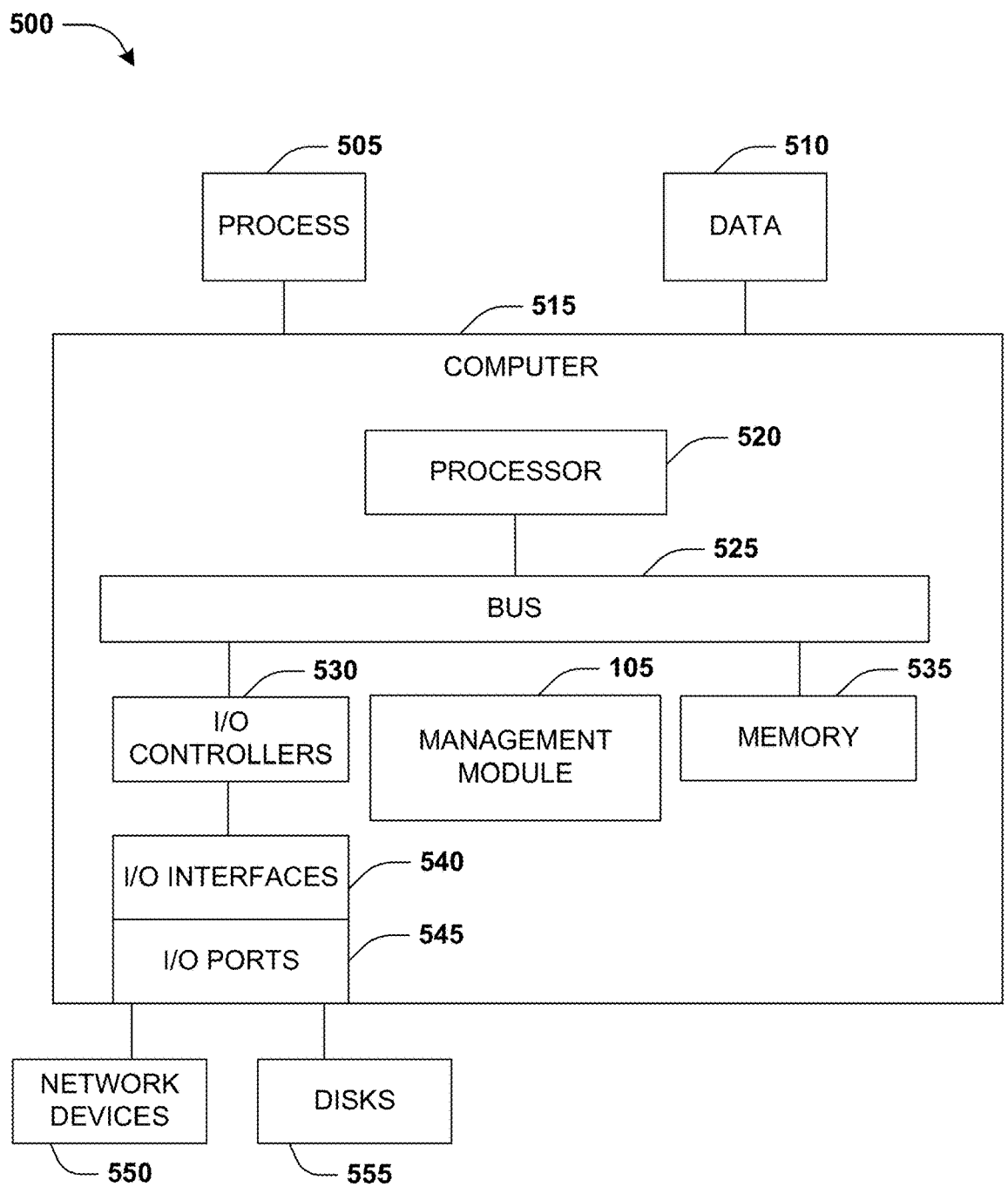
FIG. 5 illustrates an embodiment of a computing system configured with the example systems and/or methods disclosed.

FIG. 5 illustrates one embodiment of a computing system 500 that is specially configured and/or programmed with one or more of the example systems and methods described herein, and/or equivalents. The computing system 500 may include at least the computer 515 that includes a specifically programmed processor 520, a memory 535, and I/O ports 545 operably connected by a bus 525. In one embodiment, the computer 515 may include logic of the management module 105 configured to facilitate the system 100 and/or the method 200 shown in FIGS. 1-2. In different embodiments, the logic of the management module 105 may be implemented in hardware, a non-transitory computer-readable medium 505 with stored instructions, firmware, and/or combinations thereof. While the logic of the management module 105 is illustrated as a hardware component, it is to be appreciated that in other embodiments, the logic of the management module 105 could be implemented in the processor 520, stored in memory 535, or stored in disk 555.

In one embodiment, logic of the management module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the management module 105 may also provide means (e.g., hardware, non-transitory computer-readable medium 505 that stores executable instructions, firmware) for performing rule based source sequencing for allocation.

In one embodiment, processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote devices (e.g., the computer 515 may reside within a distributed computing environment to which customers/clients may connect). Networks with which the computer 515 may interact include, but are not limited to, a local area network (LAN), a new area network (WAN), and other networks.

Figure 6:
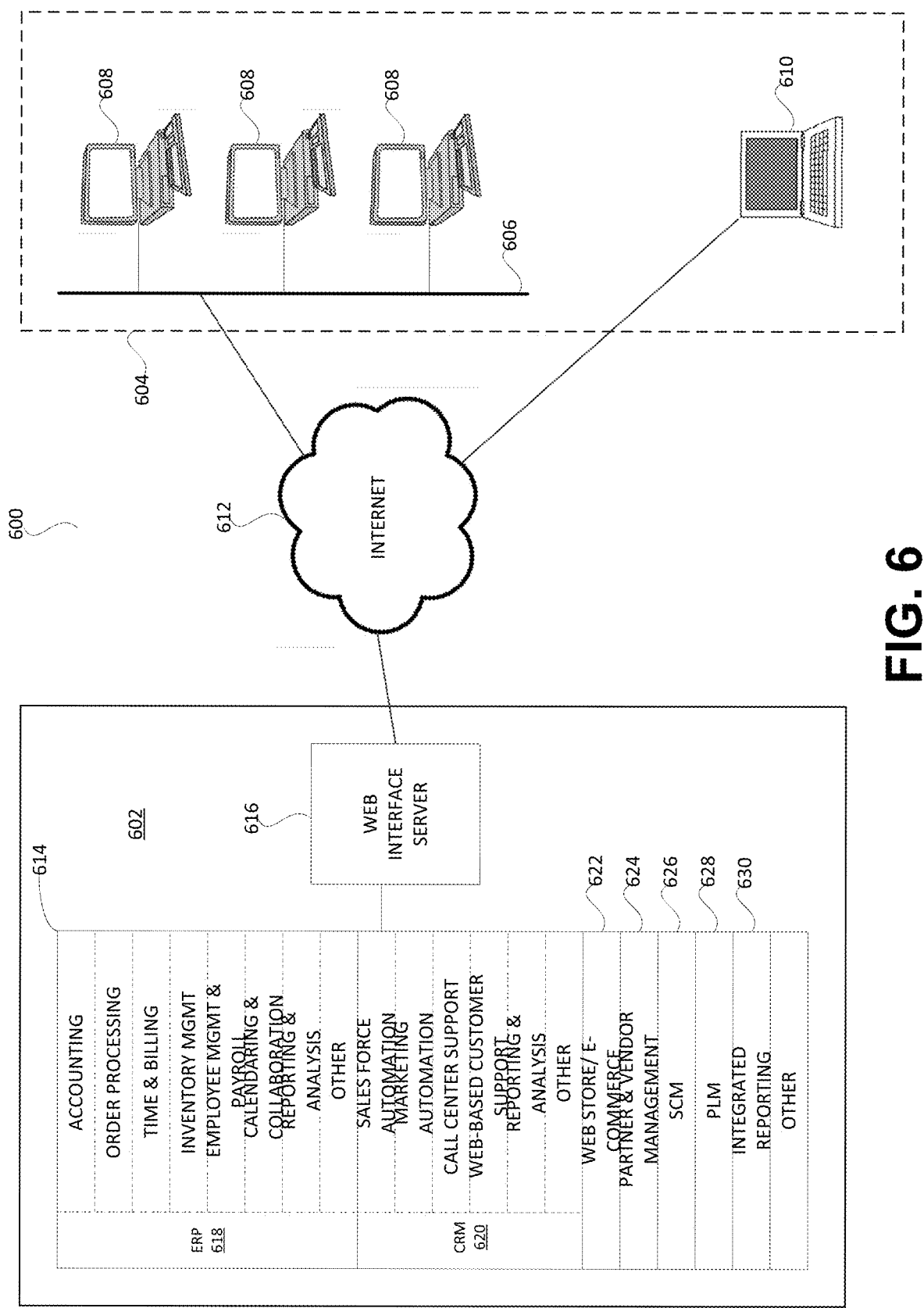
FIG. 6 illustrates an embodiment of an integrated business system and an enterprise network in which an embodiment of the invention may be implemented.

FIG. 6 is a diagram illustrating a system 600 in which an embodiment of the present system and method may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote devices, and the software applications running on the remote devices, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
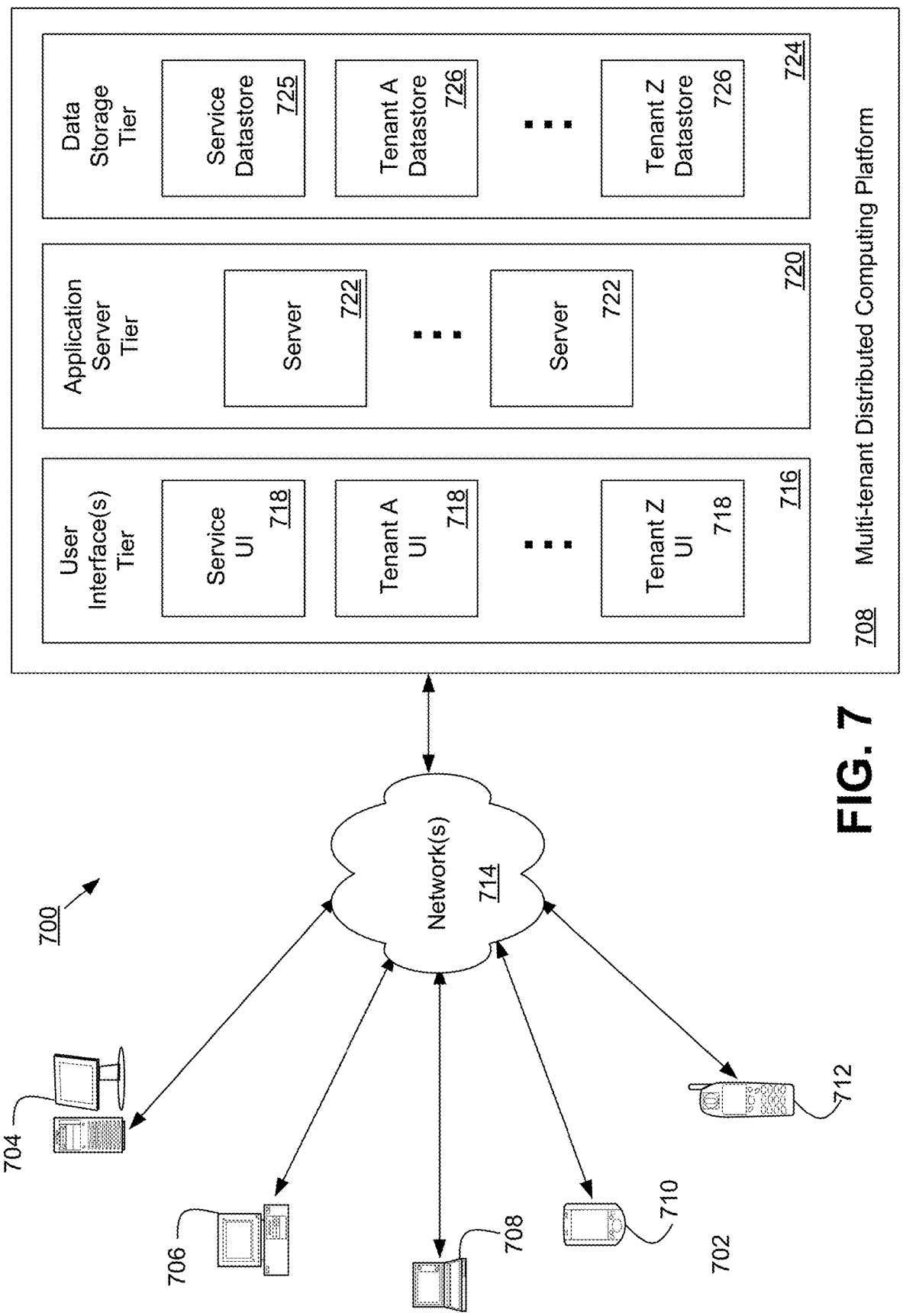
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include specially programmed or configured personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101, and no function or action described herein can be performed in the human mind. Such an interpretation is inconsistent with this specification.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:
   construct pre-provisioned instances of a service within a first pool of a zone of computing resources, wherein the service executes executable code using the computing resources, and wherein a pre-provisioned instance comprises a computing environment of computing resources configured for subsequent installation and execution of the executable code of the service;
   construct pre-orchestrated instances of the service within a second pool of the zone, wherein a pre-orchestrated instance comprises a pre-provisioned instance within which the executable code of the service is installed in a non-executing state; and
   in response to receiving a request to modify the service:
   (i) create pre-orchestrated maintenance (POM) instances of the service by applying a modified version of the executable code for the service to one or more pre-provisioned instances from the first pool;
   (ii) assign the POM instances to a third pool and remove the one or more pre-provisioned instances from the first pool; and (iii) replace the pre-orchestrated instances within the second pool using the POM instances from the third pool making the POM instances available for provisioning.

2. The non-transitory computer-readable medium of claim 1, wherein the instructions comprise instructions to:
in response to receiving a request for execution of the service:
execute the modified version of the executable code of a POM instance from the second pool as an executing instance of the service for remote access over a network by a remote device;
removing the POM instance from the second pool.

3. The non-transitory computer-readable medium of claim 2, wherein the instructions comprise instructions to:
pre-orchestrate a pre-provisioned instance from the first pool to create a new pre-orchestrated instance within the second pool by installing the modified version of the executable code into the pre-provisioned instance in the non-executing state;
reassigning the pre-provisioned instance from the first pool to the second pool.

4. The non-transitory computer-readable medium of claim 1, wherein the instructions to replace the pre-orchestrated instances comprise instructions to:
remove a first instance pointer of the pre-orchestrated instance from a collection of pointers belonging to the second pool;
add a second instance pointer of the POM instance to the collection of pointers belonging to the second pool; and
remove the second instance pointer of the POM instance from a collection of pointers belonging to the third pool.

5. The non-transitory computer-readable medium of claim 1, wherein the instructions to replace the pre-orchestrated instances comprise instructions to:
modify executing instances of the service by:
replacing the executing instances of the service using the POM instances within the second pool by decommissioning the executing instances and assigning the POM instance having the modified version of the executable code to a remote device requesting the service.

6. The non-transitory computer-readable medium of claim 5, wherein the instructions further comprise instructions to:
remove the POM instances from the third pool in response to the modified version of the executable code of the POM instances being executed.

7. The non-transitory computer-readable medium of claim 5, wherein the instructions to decommission comprise instructions to:
decommission virtual machines hosting the executing instances using the computing resources of the zone; and
assign the computing resource to an available pool of computing resources of the zone.

8. The non-transitory computer-readable medium of claim 1, wherein the instructions comprise instructions to:
in response to removing the one or more pre-provisioned instances from the first pool, replenish the first pool with one or more new pre-provisioned instances comprising computing environments of computing resources configured for subsequent installation and execution of the modified version of the executable code of the service.

9. The non-transitory computer-readable medium of claim 1, wherein the instructions comprise instructions to:
in response to receiving the request to modify the service, suspend provisioning of executing instances of the service until the request to modify is completed.

10. A computing system, comprising:
a processor connected to memory; and
a management module stored on a non-transitory computer readable medium and configured with instructions that when executed by the processor cause the processor to:
construct pre-provisioned instances of a service within a first pool of a zone of computing resources, and wherein a pre-provisioned instance does not include executable code of the service and comprises a computing environment of computing resources configured for subsequent installation of the executable code of the service;
construct pre-orchestrated instances of the service within a second pool of the zone, wherein a pre-orchestrated instance comprises a pre-provisioned instance within which the executable code of the service is installed in a non-executing state; and
in response to receiving a request to modify the service, initiate an upgrade process by causing the processor to:
create a third pool of pre-orchestrated maintenance (POM) instances of the service;
reassign one or more pre-provisioned instances from the first pool to the third pool;
apply a modified version of the executable code for the service to the one or more pre-provisioned instances to create the POM instances in the third pool; and
replace the pre-orchestrated instances within the second pool using the POM instances from the third pool making the POM instances available for provisioning.

11. The computing system of claim 10, wherein the instructions comprise instructions that cause the processor to:
in response to detecting an error during the upgrade process, generate and transmit an alert of the error over a network to a remote device.

12. The computing system of claim 10, wherein the instructions comprise instructions that cause the processor to:
replace multiple pre-orchestrated instances in parallel within the second pool.

13. The computing system of claim 10, wherein the instructions comprise instructions that cause the processor to:
evaluate resource availability of a data center hosting the zone to replace the pre-orchestrated instances within the second pool;
responsive to the resource availability indicating that less than all of the pre-orchestrated instances can be replaced in parallel, identify a number of pre-orchestrated instances that can be replaced in parallel; group the pre-orchestrated instances into sets of pre-orchestrated instances comprising no more than a number of pre-orchestrated instances that can be replaced in parallel; and
for each set of orchestrated instances, replace the pre-orchestrated instances within a set of pre-orchestrated instances in parallel by removing corresponding instance pointers from a collection of pointers belonging to the second pool.

14. The computing system of claim 10, wherein the instructions comprise instructions that cause the processor to:
 in response to receiving the request to modify the service, move executing instances of the service from the zone to a second zone.

15. A computer-implemented method, the computer-implemented method involving a computing device comprising a processor, and the computer-implemented method comprising:
 constructing, by the processor, pre-provisioned instances of a service within a first pool, wherein a pre-provisioned instance comprises a computing environment of computing resources configured for subsequent installation of executable code of the service;
 adding instance pointers of the pre-provisioned instances to a first pool pointer list;
 constructing, by the processor, pre-orchestrated instances of the service within a second pool, wherein a pre-orchestrated instance comprises one of the pre-provisioned instances installed with the executable code of the service in a non-executing state;
 adding instance pointers of the pre-orchestrated instances to a second pool pointer list; and
 in response to receiving a request to modify the service, initiating an upgrade process comprising:
  creating, by the processor, a third pool of pre-orchestrated maintenance (POM) instances of the service identified by a third pool pointer list;
  moving, by the processor, instance pointers of one or more pre-provisioned instances from the first pool pointer list to the third pool pointer list;
  applying a modified version of the executable code for the service to the one or more pre-provisioned instances to create the POM instances; and
  replacing, by the processor, the pre-orchestrated instances within the second pool with the POM instances from the third pool.

16. The computer-implemented method of claim 15, wherein replacing the pre-orchestrated instances within the second pool comprises:
 removing the instance pointers for the pre-orchestrated instances from the second pool pointer list;
 adding the instance pointers for the POM instances to the second pool pointer list; and
 removing the instance pointers for the POM instances from the third pool pointer list.

17. The computer-implemented method of claim 15, further comprising:
 in response to receiving a request for execution of the service:
  assigning a POM instance from the second pool to a customer;
  executing the modified version of the executable code of the POM instance as an executing instance of the service for remote access over a network by remote device;
  removing the instance pointer of the POM instance from the second pool pointer list.

18. The computer-implemented method of claim 17, further comprising:
 creating a new pre-orchestrated instance within the second pool to replace the removed POM instance by installing the modified version of the executable code into one of the pre-provisioned instances in the first pool in the non-executing state; and
 removing the instance pointer of the pre-provisioned instance from the first pool pointer list.

19. The computer-implemented method of claim 15, wherein moving the instance pointers of the one or more pre-provisioned instances from the first pool pointer list to the third pool pointer list comprises:
 removing the instance pointers of the one or more pre-provisioned instances from the first pool pointer list; and
 adding the instance pointers of the one or more pre-provisioned instances to the third pool pointer list.

20. The computer-implemented method of claim 15, further comprising:
 modifying executing instances of the service by:
  replacing the executing instances of the service with the POM instances within the second pool by decommissioning the executing instances and
  executing the modified version of the executable code of the POM instances as modified executing instances of the service.

* * * * *

UNITED STATES PATENT AND TRADEMARK OFFICE
CERTIFICATE OF CORRECTION

PATENT NO. : 10,785,129 B2
APPLICATION NO. : 16/272100
DATED : September 22, 2020
INVENTOR(S) : Greenstein et al.

Page 1 of 1

It is certified that error appears in the above-identified patent and that said Letters Patent is hereby corrected as shown below:

In the Specification

In Column 1, Line 58, delete "In" and insert -- in --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*